United States Patent [19]
Meiller et al.

[11] Patent Number: 5,979,990
[45] Date of Patent: Nov. 9, 1999

[54] VEHICLE SEAT WITH SAFETY BELT ASSEMBLY

[75] Inventors: Hermann Meiller, Amberg; Josef Kohl, Hirschau; Theodor Abels, Aschaffenburg, all of Germany

[73] Assignee: Grammer AG, Amberg, Germany

[21] Appl. No.: 09/196,413

[22] Filed: Nov. 19, 1998

[30] Foreign Application Priority Data

Dec. 6, 1997 [DE] Germany .......................... 197 54 241

[51] Int. Cl.⁶ .................................................. B60R 22/26
[52] U.S. Cl. .......................... 297/468; 297/475; 297/481
[58] Field of Search .................................... 297/468, 474, 297/475, 481, 482

[56] References Cited

U.S. PATENT DOCUMENTS

| | | | |
|---|---|---|---|
| 2,904,347 | 9/1959 | Tucker | 297/468 |
| 3,127,652 | 4/1964 | Springer | 297/468 X |
| 3,265,439 | 8/1966 | McEwen | 297/468 |
| 3,294,444 | 12/1966 | Anderson | 297/468 |

FOREIGN PATENT DOCUMENTS

| | | |
|---|---|---|
| 2225012 | 10/1974 | France ................................... 297/475 |
| 1057476 | 10/1959 | Germany . |
| 1231123 | 12/1966 | Germany . |
| 1964123 | 7/1971 | Germany . |
| 2236128 | 2/1973 | Germany . |

*Primary Examiner*—Peter R. Brown
*Attorney, Agent, or Firm*—Elliot M. Olstein; Raymond J. Lillie

[57] ABSTRACT

Described is a vehicle seat having a safety belt which can be extended from a belt retractor. The belt retractor is mounted to one side of the vehicle seat. A belt end portion which projects from the belt retractor is provided with a spring hook means. An engagement element for retainingly receiving the spring hook means is disposed at the second side of the vehicle seat.

14 Claims, 3 Drawing Sheets

VEHICLE SEAT WITH SAFETY BELT ASSEMBLY

FIELD OF THE INVENTION

The invention concerns a vehicle seat with a safety belt assembly.

BACKGROUND OF THE INVENTION

A typical form of safety belt assembly for a vehicle seat comprises a safety belt webbing which can be pulled out of a belt retractor and which is provided with a fixing element. The belt retractor is fixed at one side of the vehicle seat while an engagement element for receiving the fixing element on the belt webbing is mounted at the second side of the vehicle seat. A vehicle seat with safety belt assembly of that kind is to be found in German laid-open application (DE-OS) No 2 236 128. In that case the fixing element on the safety belt is formed by a tongue member while the engagement element provided for retainingly receiving the fixing element is formed by a belt lock for the tongue member. Insertion of the tongue member into the belt lock, which requires a push-in engagement movement, involves those two components being precisely guided relative to each other, which however is possible only by using two hands. That relatively complicated procedure often means that the occupant of the seat does not bother to fit the safety belt. That however is extremely dubious and potentially dangerous from safety points of view.

German laid-open application (DE-OS) No 1 964 123 discloses a vehicle seat with a safety belt assembly comprising a safety belt having a fixing element in the form of a spring hook device which can be latchingly engaged into an associated engagement element. A spring hook device of that kind can also be referred to as a carabiner device. In that arrangement however the safety belt is yieldingly flexible over its entire length between fixing points on the vehicle and the spring hook device, and such flexibility makes itself felt in terms of handling of the safety belt, that is to say handling thereof when engaging the spring hook device into the engagement element.

German patent specification No 1 057 476 discloses a release device for harness belt straps in a vehicle. That release device is characterised by a pin which is arranged displaceably transversely with respect to the longitudinal direction of the vehicle and which is moved outwardly due to the force of a spring until encountering an abutment. At the outer end the pin has a knob with rounded surface for actuation by the door of the vehicle in such an arrangement that the pin is pushed back against the force of the spring when the vehicle door is closed and passes with a portion of the pin into a space defined by two lugs, and with that pin portion serves as a counterpart member for co-operation with an engagement member, preferably in the form of a spring hook device, at one end of the harness strap. The other end of the harness strap is secured to the vehicle seat or is fixed in position in the proximity of the vehicle seat. On the other hand, when the vehicle door is opened, the pin which is pushed outwardly by the spring releases the engagement member of the belt. This also involves a harness strap which is flexible between spring hooks at the ends thereof.

German published specification (DE-AS) No 1 231 123 describes a vehicle seat in combination with a safety belt assembly. In that case however the safety belt is not fixed to the vehicle seat but to the vehicle itself. That safety belt which is specific to the respective vehicle involved is provided with a spring hook device which can be fixed to an engagement member by hooking engagement therewith. Between the fixing locations and the spring hook device that safety belt is also flexibly yielding over its entire length.

SUMMARY OF THE INVENTION

An object of the present invention is to provide a vehicle seat with a safety belt assembly, wherein fitting of the safety belt to the seat occupant can be reliably effected in a simple manner without requiring a great deal of time.

Another object of the present invention is to provide a vehicle seat with safety belt assembly, so designed as to permit fitting and release of the safety belt with one hand.

Still another object of the present invention is to provide a vehicle seat having a safety belt arrangement wherein the belt webbing can be fitted around a seat occupant without requiring precise positioning of safety belt lock components in order to ensure reliable interengagement thereof.

In accordance with the principles of the present invention the foregoing and other objects are achieved by a vehicle seat having a first side and a second side and including a safety belt arrangement comprising a safety belt and a belt retractor from which the safety belt can be extended. The belt retractor is mounted to one side of the vehicle seat and an engagement element is mounted to the second side of the vehicle seat, for engagement with a fixing element of the safety belt. The fixing element comprises a spring hook means having a flat main body with a spring hook thereon, a locking member being pivotably movably mounted on the main body and a spring means being operatively disposed between the locking member and the main body. The belt retractor is fitted to a flat base portion mounted to the first side of the vehicle seat. Mounted on the base portion is a pivot arm which is pivotable in an at least substantially vertical plane and which is provided with a belt guide means through which an end portion of the safety belt extends. That end portion of the safety belt has the spring hook means.

As will become apparent from the description hereinafter of a preferred embodiment of the invention, the design configuration according to the invention with a spring hook means at the belt end portion that extends from the belt retractor and an engagement element for the spring hook means, mounted at the second side of the vehicle seat, affords the advantage that it is easily possible for a seat occupant to reliably connect the spring hook means to the engagement element, without that operation taking up a great deal of time or skill and care. It is particularly desirable in that respect if the engagement element at the second side of the vehicle seat is virtually stationary so that, using just one hand, it is easily possible to grip the end portion of the belt and to bring the spring hook means into latching engagement with the engagement element. If the engagement element involves suitable dimensioning, there is the advantage that there is no need for visual checking or contact in relation to the engagement element, but on the contrary it is then possible without difficulty for the spring hook means to be latched so-to-speak blind with the engagement element.

For right-handed persons it is desirable in that respect for the belt retractor with the spring hook means to be disposed at the left-hand side of the vehicle seat and for the engagement element to be disposed on the right-hand side of the vehicle seat so that the right hand can be used to pull the belt end portion with its spring hook means out of the belt retractor, take it around the body or torso of the occupant of the seat and then bring it into latching engagement in the engagement element on the right-hand side. Reliable latching of the spring hook means to the engagement element occurs by virtue of the spring hook means being of a resilient design configuration. During the operation of engaging the spring hook means into the engagement element the spring means operatively disposed between the locking member and the main body is stressed. As soon as the engagement condition is reached the spring means can be relieved of stress again whereby the locking member assumes a locking position in relation to the hook configuration of the spring hook means. In order to release that locking position at the appropriate time an actuating element for the locking member can be provided on the main body. That actuating element can be in the form of an actuating handle or grip which is mounted on the main body pivotably about a pivot axis. A second spring means is desirably operatively disposed between the actuating handle and the main body. Due to the force of that second spring means, in the normal rest condition the actuating handle adopts a position in which it suitably projects from the main body. When then the actuating handle is actuated, that is to say for example depressed, the second spring element is mechanically stressed and at the same time the locking member moves away from the hook configuration of the spring hook means into a release position in which the spring hook means can then be disengaged from the engagement element and the belt can be retracted back into the belt retractor.

In accordance with a preferred feature of the invention the hook of the spring hook means and/or the locking member involve an undercut configuration such that panic exit from the vehicle seat on the part of the seat occupant is reliably prevented, that is to say even when the actuating element is actuated, abrupt release of the spring hook means from the engagement element is scarcely possible.

In accordance with a preferred feature of the invention the engagement element which is disposed in fixed relationship with respect to the seat has a bar portion having a free end to which a loop element is fixed. In that arrangement the loop portion can be in the form of a leaf spring strip portion in order to provide for limited mobility of the loop element disposed at the free end of the bar portion. It is likewise possible for the bar portion to be formed by at least one wire or cable portion.

In order to provide that the engagement element can adapt as wanted to the anatomy of the respective occupant of the seat, a preferred feature of the invention can provide that the bar portion is mounted at the second side of the vehicle seat limitedly pivotably about a pivot axis in a longitudinal plane of the seat. It can be desirable for the same purpose for the bar portion to be limitedly pivotable about a second pivot axis in a transverse plane of the seat. In that connection, the first and second pivot axes can be such that the force applied for pivoting the bar portion in the longitudinal plane of the seat is different from the force required for pivoting the bar portion in the transverse plane. In that respect it may be desirable if pivotal movement in the longitudinal plane of the seat can be implemented by the application of a lower amount of force than pivotal movement of the bar portion in the transverse plane of the seat.

In accordance with another preferred feature of the invention the belt retractor and the belt guide means through which the end portion carrying the spring hook means extends include relative to each other an angle which is different from 180°, while a belt deflection or direction-changing member is pivotably movably mounted on the base portion between the belt retractor and the belt guide means. The belt direction-changing member can be a direction-changing loop which is of a closed configuration and which is freely pivotably mounted on the base portion in order to achieve optimum adaptation of the way in which the belt runs, to the anatomical aspects of the respective occupant of the seat. Automatic adaptation of that kind involves minimised frictional losses in the region of the belt direction-changing member, and that also has a positive effect on operational comfort and convenience.

In accordance with another preferred feature of the invention the pivot arm can have a switch member for a switch. The switch can then be disposed on the base portion and can be operatively connected for example to the ignition circuit of the vehicle in which the seat is fitted. The vehicle may be for example a stacker truck. The ignition system of the vehicle can then be activated only when the belt has been fitted, that is to say when the pivot arm has been correspondingly pivoted in order for the seat occupant to fit the belt in its operative condition.

In a preferred feature of the invention the base portion may have an abutment for establishing a rest position for the pivot arm. The abutment is preferably disposed in such a way that in its rest position the pivot arm does not make itself felt as a nuisance or trouble but is disposed laterally for example beside the seat squab portion in order to ensure unimpeded access to the vehicle seat. The provision of the pivot arm and the belt guide means on the pivot arm provide that the belt or the main body with the spring hook means is offered to the seat occupant in the optimum fashion because the flat main body with the spring hook means at the free end portion of the belt can be gripped in optimum fashion by the seat occupant to fit the belt.

Further objects, features and advantages of the invention will be apparent from the description hereinafter of a preferred embodiment thereof.

DESCRIPTION OF THE PREFERRED EMBODIMENT

Figure 1:
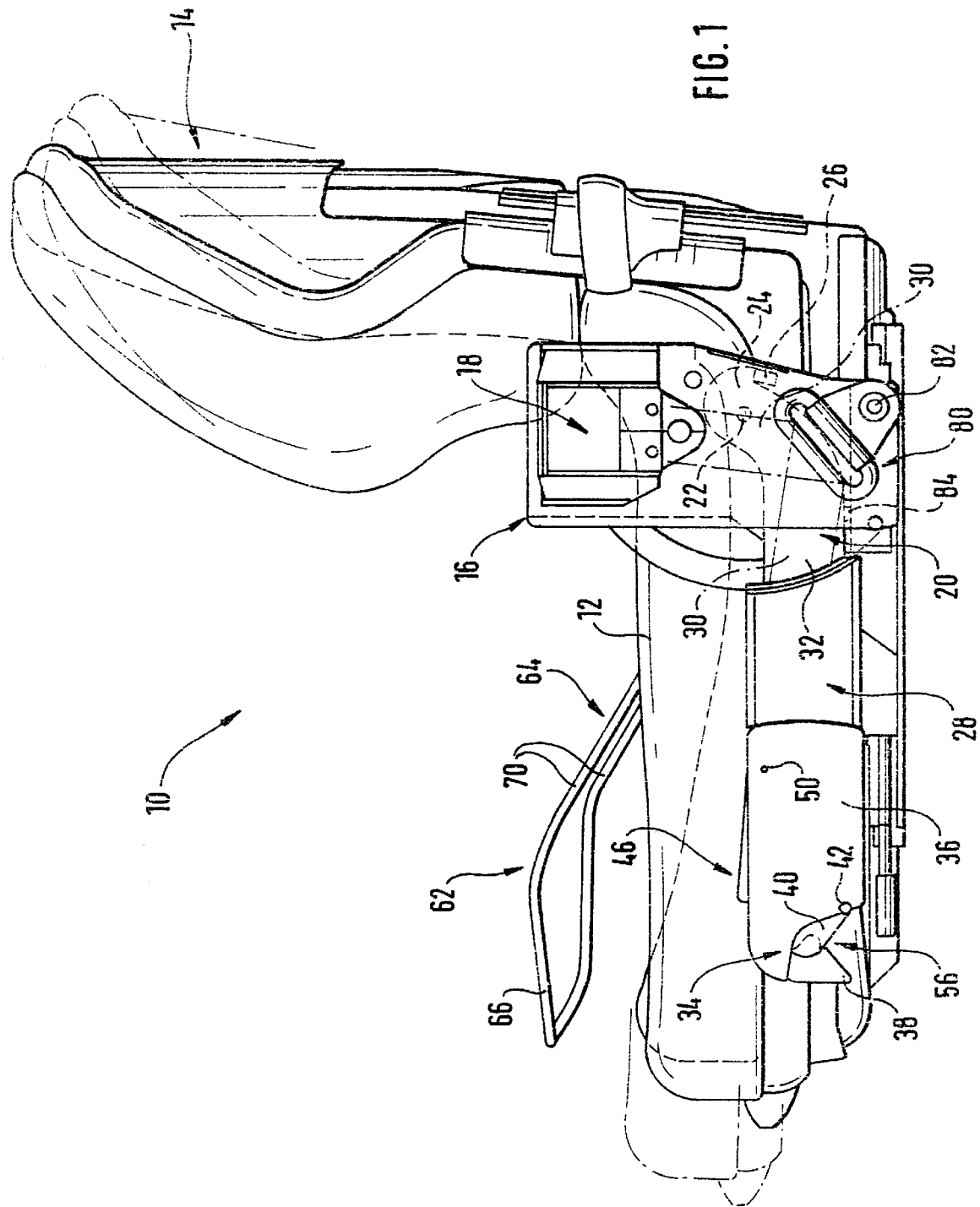
FIG. 1 is a diagrammatic side view of a vehicle seat according to the invention.

Referring firstly to FIG. 1, shown therein is a side view of an embodiment of the vehicle seat according to the invention as indicated generally by reference numeral 10, with a seat squab portion 12 and a backrest portion 14. The seat squab portion 12 is adjustable in terms of seat depth, as indicated by the thin dash-dotted lines. The backrest portion 14 is adjustable as desired in terms of its inclination, as is also indicated by thin dash-dotted lines.

Mounted to the seat squab portion 12 in the transitional region between the seat squab portion 12 and the backrest portion 14 is a flat base portion 16. Reference 18 denotes a belt retractor which is fixed to the base portion 16. A pivot arm 20 is also mounted to the base portion 16, being pivotable in a vertical plane about an associated axis diagrammatically indicated at 22. In the proximity of the axis 22 the pivot arm 20 has a switch member 24 which serves to actuate a switch 26. The switch 26 can be operatively linked for example to the ignition system of the vehicle to which the vehicle seat 10 is fitted, for example to immobilise the ignition system until the seat belt arrangement is fitted to the seat occupant.

The pivot arm 20 is also provided with a belt guide element 28 comprising a component in the form of a flat tube. A safety belt 30 extends with a free end portion 32 thereof through the belt guide element 28. The free belt end portion 32 has a certain degree of stability in respect of shape. Reference numeral 34 denotes a spring hook means which is suitably fixed to the free end portion 32 of the belt 30. The spring hook means 34 has a flat main body indicated at 36, with a spring hook as indicated at 38. As can also be clearly seen from FIG. 3, a locking member 40 is mounted on the main body 36 of the spring hook means 34, being pivotable about an axis as indicated diagrammatically at 42. The locking member 40, like the spring hook 38, is of such a shape as to involve an undercut configuration, that is to say it is hook-shaped to prevent the seat occupant from exiting the vehicle seat in a state of panic.

Figure 3:
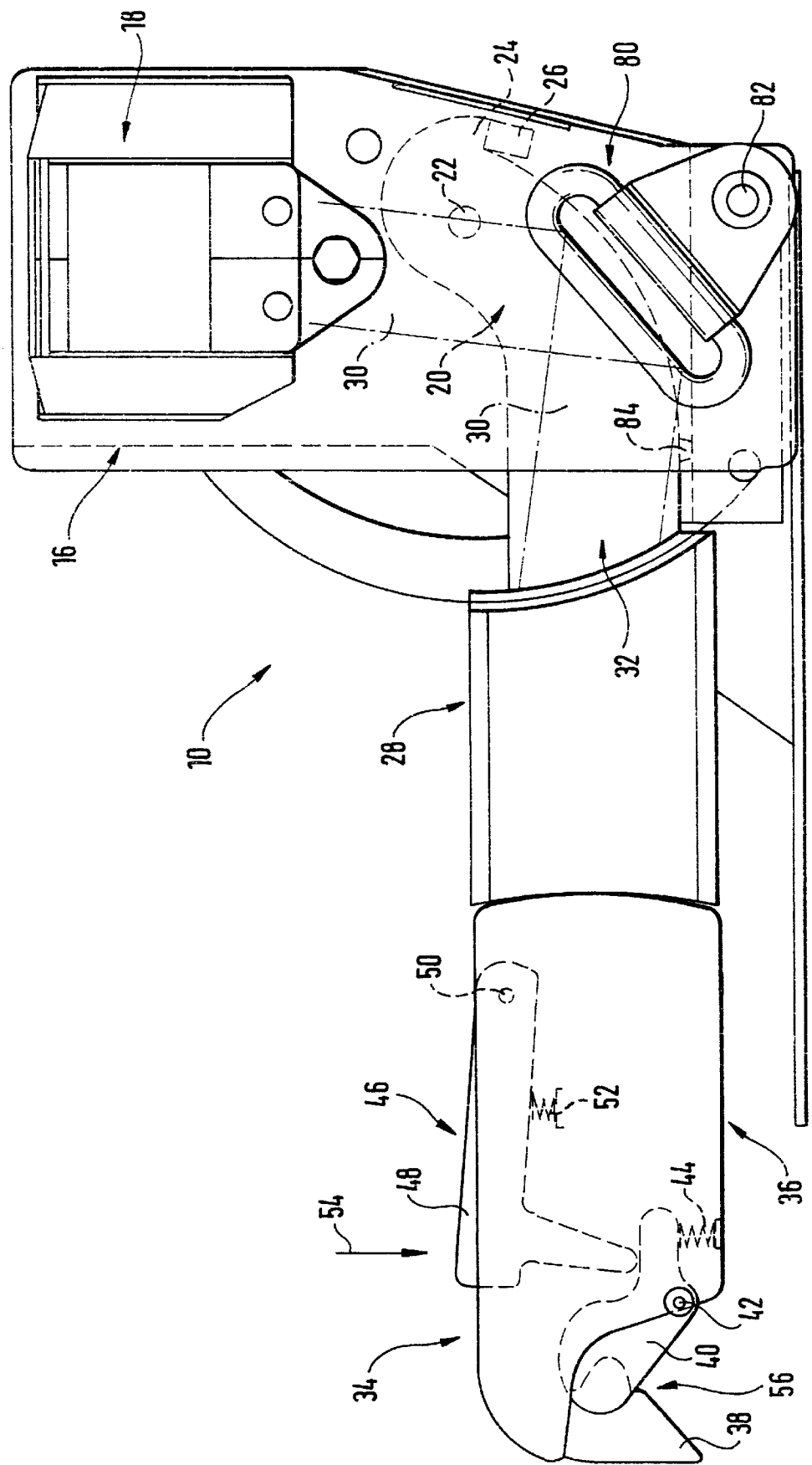
FIG. 3 is a side view on a larger scale of details of the vehicle seat according to the invention, in particular of the safety belt system of the vehicle seat shown in FIGS. 1 and 2.

Reference will still be made to FIG. 3 to note that a spring member 44 is provided between the locking member 40 and the flat main body 36 of the spring hook means 34. The spring member 44 is for example a coil compression spring. In the normal operative condition of the spring hook means 34 the locking member 40 is urged towards the spring hook 38 of the spring hook means 34 by the force of the spring member 44. An actuating element 46 which is in the form of an actuating handle or grip indicated at 48 in FIG. 3 is provided on the main body 36 for opening the spring hook means 34. The actuating handle 48 is mounted to the main body 36 pivotably about a pivot axis diagrammatically indicated at 50. Operatively disposed between the actuating handle 48 and the main body 34 is a second spring member 52 which, like the first spring member 44, can be in the form of a compression coil spring. When the actuating handle 48 is depressed, as indicated by the arrow 54 in FIG. 3, the locking member 40 is pivoted in the clockwise direction about its axis 42 and the mouth 56 of the spring hook means 34 is opened.

Figure 2:
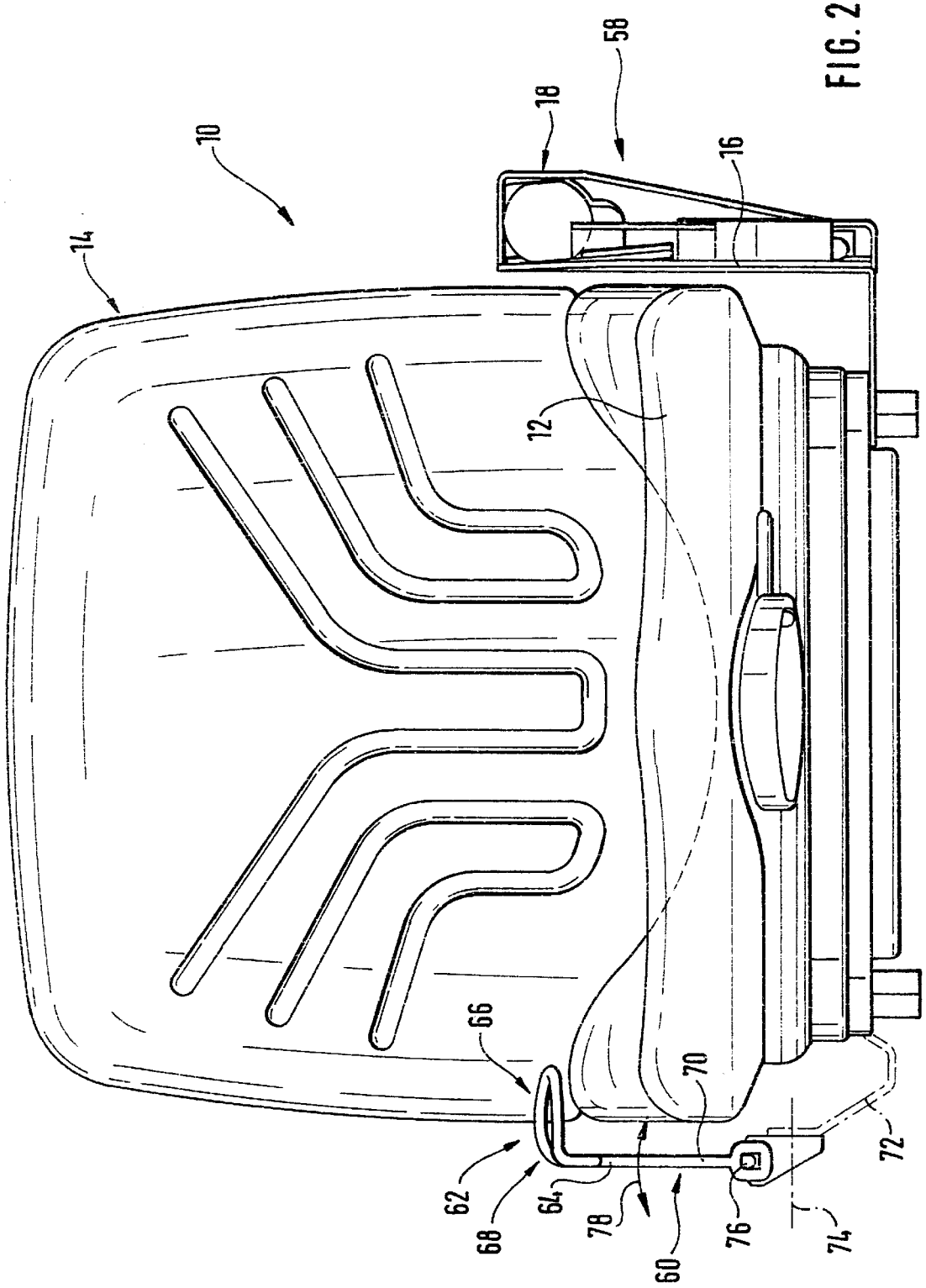
FIG. 2 is a view of the vehicle seat of FIG. 1 viewing from the front thereof.

As can be seen from FIG. 1 and in particular FIG. 2, the belt retractor 18 is mounted to the vehicle seat 10 at one side as indicated at 58 in FIG. 2. Mounted at the opposite second side as indicated at 60 in FIG. 2 of the vehicle seat 10 is an engagement element 62 for latchingly engaging the spring hook means 34. The engagement element 62 has a bar portion 64 and a loop element 66 which is disposed at or fixed to the free end 68 of the bar portion 64. The bar portion 64 can for example be in the form of a leaf spring strip, but it can also be formed by at least one wire or cable element. FIG. 1 shows a structure in which the bar portion 64 is formed by two wire members 70 which extend in mutually juxtaposed relationship and which go directly into the loop element 66 which is thus formed thereby.

The bar portion 64 of the engagement element 62 for the spring hook means 34 is mounted to a bracket indicated at 72 in FIG. 2 pivotably about a horizontal axis 74, that is to say pivotably in a longitudinal plane of the seat. The bar portion 64 is also pivotable about a second pivot axis 76 in a transverse plane of the seat, as is indicated in FIG. 2 by the arcuate double-headed arrow 78.

As the belt retractor 18 and the belt guide element 28 on the pivot arm 20 include an angle that is different from 180° with each other, it is necessary for the safety belt 30 to experience a change in direction between the belt retractor 18 and the belt guide element 28. For that purpose, a belt deflection or direction-changing member 80 is mounted on the base portion 16 freely pivotably about an axis as diagrammatically indicated at 82 in FIG. 1. Also provided on the base portion 16 is an abutment 84 for fixing the pivot arm 20 in its inoperative position, in which the seat belt is therefore not in use and fitted around a seat occupant.

When a person wishing to occupy the vehicle seat 10 takes his place thereon, he can grip the spring hook means 34 with the one hand, pivot the pivot arm 20 about the axis 22 in the clockwise direction, pull the safety belt 30 from the retractor 18, that is to say remove the spring hook means 34 from the belt guide element 28 on the pivot arm 20, and fix the spring hook means 34 in resilient latching engagement to the loop element 66 of the engagement element 62 at the second side 60 of the vehicle seat 10. That can all be effected easily and without any difficulty using one hand. If the seat occupant wishes to leave the vehicle seat 10, he only needs to depress the actuating handle 48 on the main body 36 of the spring hook means 34 in the direction indicated by the arrow 54 in FIG. 3 in order thus to release the locking member 40 of the spring hook means 38 and thereby open the mouth 56 of the spring hook means 34. In that position the spring hook means 34 can then be removed from the loop element 66 of the engagement element 62 and the safety belt 30 can be automatically retracted into the belt retractor 18 again until the flat main body 36 on the free belt end portion 32 again bears against the belt guide element 28 of the pivot arm 20 in snugly and accurately positioned relationship therewith.

The fact that, in accordance with the invention, the belt retractor 18 is fixed to a flat base portion 16 which is mounted to the first side of the seat and mounted to the base portion is a pivot arm 20 which is pivotable in a vertical plane and which carries a belt guide element 28 through which the belt end portion carrying the spring hook means 34 extends affords the advantage that any vehicle seat can be equipped with the safety belt arrangement in accordance with the principles of the invention, including subsequently, as a retro-fit assembly. The flat base portion 16 is preferably fixed in the transitional region between the seat squab portion 12 and the backrest portion 14 of the vehicle seat in order to implement an ergonomic system for holding a belt in a position of easy access. A further contribution to ease of operation in a similar respect is afforded if the belt end portion 32 carrying the spring hook means 34 is at least to a limited extent stable in respect of shape in order jointly with the belt guide element 28 on the pivot arm 20 to provide for optimum belt guidance and readiness. Such a design configuration makes it possible to provide for ergonomically attractive positioning of the entire system and in particular the guide path for the safety belt and the spring hook means in relation to the engagement element, which is so-to-speak stationary, of the vehicle seat according to the invention.

As already mentioned hereinbefore the vehicle seat according to the invention enjoys the advantage of operation with one hand as well as involving a reduced amount of time for fitting and removing the safety belt. The spring hook means 34 is disposed beside the vehicle seat in a position in which it is ready to be gripped, the position of the belt system and the path along which it is guided are ergonomically correct, while in operation of the vehicle equipped with the vehicle seat according to the invention impediments to performing the required movements are at least substantially avoided, so that the system affords excellent freedom of movement. A further advantage of the present invention is that locking of the safety belt can be implemented when danger values are reached, for example due to transverse acceleration forces or due to the vehicle tilting or tipping over. For that purpose the belt retractor can be provided with suitable acceleration and/or inclination sensors. The vehicle seat also advantageously prevents the seat occupant from exiting therefrom in a panic. Furthermore, the vehicle seat with its safety belt arrangement according to the invention avoids impediments to the seat occupant when climbing on to or down from the vehicle seat, while the way in which the safety belt runs can be easily adapted to any seat occupant body size, in the manner noted hereinbefore.

It will be appreciated that the above-described embodiment of the invention has been set forth solely by way of example and illustration of the principles thereof and that various other modifications and alterations may be made therein without thereby departing from the spirit and scope of the invention.

What is claimed is:

1. A vehicle seat having a first side and a second side and with a safety belt assembly including:
   a base portion mounted to the first side of the vehicle seat,
   a belt retractor mounted to the base portion at the first side of the vehicle seat,
   a pivot arm pivotably mounted to said base portion so as to pivot in a vertical plane,
   a safety belt having an end portion projecting from the belt retractor and adapted to be extended from the belt retractor,
   a belt guide means on said pivot arm, through which said end portion of said safety belt extends in guided relationship,
   a fixing element on the end portion of the safety belt, the fixing element comprising a spring hook means having a main body with a spring hook including a locking member, means pivotably movably mounting the locking member to the main body and a spring means operatively disposed between the locking member and the main body, and
   an engagement element for retainingly securing the fixing element and mounted to the second side of the vehicle seat.

2. A vehicle seat as set forth in claim 1 wherein said main body is substantially flat.

3. A vehicle seat as set forth in claim 1 wherein said base portion is substantially flat.

4. A vehicle seat as set forth in claim 1 wherein the belt retractor and the belt guide means are disposed at an angle to each other, and further including a belt direction-changing member pivotably and movably mounted on the base portion between the belt retractor and the belt guide means.

5. A vehicle seat as set forth in claim 1 wherein the pivot arm has a switch actuation member for actuating a switch, wherein the switch is linked operatively to an ignition system of the vehicle.

6. A vehicle seat as set forth in claim 1
   wherein the base portion has an abutment for establishing a rest position for the pivot arm.

7. A vehicle seat as set forth in claim 1 and further including
   an actuating element for actuating the locking member, the actuating element being disposed on the main body.

8. A vehicle seat as set forth in claim 7
   wherein the actuating element is in the form of an actuating handle which is pivotably mounted on the main body about a pivot axis, and further including
   a second spring means operatively disposed between the actuating handle and the main body.

9. A vehicle seat as set forth in claim 1
   wherein the engagement element includes a bar portion having a free end, and a loop means fixed at said free end of said bar portion.

10. A vehicle seat as set forth in claim 9
    wherein said bar portion is in the form of a leaf spring strip portion.

11. A vehicle seat as set forth in claim 9
    wherein said bar portion is formed by at least one wire portion.

12. A vehicle seat as set forth in claim 9
    wherein said bar portion is formed by at least one cable portion.

13. A vehicle seat as set forth in claim 9
    wherein the seat has a longitudinal plane and the bar portion is pivotably to the second side of the vehicle seat about a first pivot axis in the longitudinal plane of the seat.

14. A vehicle seat as set forth in claim 13
    wherein the seat has a transverse plane and the bar portion is additionally pivotably mounted to the second side of the vehicle seat about a second pivot axis in the transverse plane of the seat.

* * * * *